(12) United States Patent
Goto (10) Patent No.: US 7,502,557 B2
(45) Date of Patent: Mar. 10, 2009

(54) FINDER OPTICAL SYSTEM AND IMAGING APPARATUS COMPRISING THE SAME

(75) Inventor: Hisashi Goto, Tokyo (JP)

(73) Assignee: Olympus Corporation, Tokyo (JP)

( * ) Notice: Subject to any disclaimer, the term of this patent is extended or adjusted under 35 U.S.C. 154(b) by 402 days.

(21) Appl. No.: 11/299,952

(22) Filed: Dec. 13, 2005

(65) Prior Publication Data

US 2006/0133793 A1    Jun. 22, 2006

(30) Foreign Application Priority Data

Dec. 20, 2004    (JP)    ............ P 2004-367998

(51) Int. Cl.
*G03B 13/24*    (2006.01)
(52) U.S. Cl. .................. 396/150; 348/341
(58) Field of Classification Search ......... 396/150–152, 396/373, 382, 385; 348/341
See application file for complete search history.

(56) References Cited

U.S. PATENT DOCUMENTS

| | | | | |
|---|---|---|---|---|
| 4,387,967 A | * | 6/1983 | Yamazaki et al. | ............ 359/687 |
| 4,525,744 A | * | 6/1985 | Nakamura et al. | .......... 348/341 |
| 5,363,163 A | | 11/1994 | Hayashi et al. | |
| 5,848,308 A | * | 12/1998 | Kawamura | .................. 396/374 |

FOREIGN PATENT DOCUMENTS

| JP | 02-520683 | 5/1996 |
|---|---|---|
| JP | 2000-165730 | 6/2000 |
| JP | 2002-139773 | 5/2002 |
| JP | 03-382317 | 12/2002 |

* cited by examiner

*Primary Examiner*—W. B. Perkey
(74) *Attorney, Agent, or Firm*—Kenyon & Kenyon LLP (57) ABSTRACT

In a finder optical system, a primary image is formed by an objective lens on a primary image formation face and is passed via a relay optical system to form a secondary image on a secondary image formation face. This secondary image is observed via an ocular lens system. A diffuser is arranged at the position of the secondary image formation face.

16 Claims, 5 Drawing Sheets

FINDER OPTICAL SYSTEM AND IMAGING APPARATUS COMPRISING THE SAME

BACKGROUND OF THE INVENTION

1. Field of the Invention

The present invention relates to a finder optical system, which is used in a digital still camera and the like, using a secondary image-formation method which reverses a primary image consisting of an inverted image to a secondary image consisting of an erecting image in order to observe via an ocular optical system, and an imaging apparatus comprising the same.

Priority is claimed on Japanese Patent Application No. 2004-367998, filed Dec. 20, 2004, the content of which is incorporated herein by reference.

2. Description of Related Art

In recent years, there is an increasing demand for digital still cameras, including a digital single-lens reflex camera which uses an image pickup device whose size is a fraction of the film diagonal length in a silver salt 35 mm film camera. Since the angle of the view of the finder optical system in such a camera must be wide enough for a high-grade camera, it is necessary to shorten the focal length of the overall finder optical system. It is also necessary to provide an erecting optical system between the primary image formation face of the finder optical system and the ocular optical system. In a finder optical system, the pupil diameter and eye point position are fixed, irrespective of the focal length of the ocular optical system.

One conventional method which is generally known is a secondary image formation method using an objective optical system to form an image temporarily in the finder optical system, and then reforming the image by reversing this image using a lens array, thereby reducing the load on the ocular optical system. For example, this type of finder optical system is disclosed in Japanese Patent No. 2520683 and Japanese Patent No. 3382317.

An optical system for focal point detection in a single-lens reflex camera generally has a configuration for adjusting the focal point, wherein a luminous flux for taking image is transmitted through a main mirror for switching the optical path and is led in the opposite direction from the finder optical system by a sub-mirror (Japanese Patent No. 3010813).

Japanese Unexamined Patent Publication No. 2002-139773 proposes a finder device which uses a secondary image formation-type finder optical system to superimpose a display image within the field of view.

SUMMARY OF THE INVENTION

A first aspect of the present invention is a finder optical system, in which a primary image is formed by an objective lens on a primary image formation face and is passed via a relay optical system to form a secondary image on a secondary image formation face, the secondary image being observed via an ocular lens system, the finder optical system comprising: a condenser lens having positive power arranged in the vicinity of the primary image formation face; and a focus plate arranged at a position of the secondary image formation face, wherein the relay optical system comprises a relay lens group having positive power and including a plurality of lenses, and is arranged between the condenser lens and the secondary image formation face.

A second aspect of the present invention is a finder optical system according to the first aspect, wherein a condenser function member is provided in the vicinity of the secondary image formation face.

A third aspect of the present invention is a finder optical system according to the first aspect, wherein the focus plate is attachably and detachably provided on the optical path.

A fourth aspect of the present invention is a finder optical system according to the first aspect, wherein the focus plate includes a diffuser and is provided exchangeably with another focus plate having different diffusion characteristics.

A fifth aspect of the present invention is a finder optical system according to the first aspect, further comprising: an optical path divider for dividing a luminous flux into a finder luminous flux and a luminous flux for focal point detection, arranged between the primary image formation face and the secondary image formation face; and a focal point detection optical system arranged on an optical path of the divided luminous flux for focal point detection.

A sixth aspect of the present invention is a finder optical system according to the first aspect, further comprising: an optical path divider for dividing a luminous flux into a finder luminous flux and a luminous flux for photometry, arranged between the primary image formation face and the secondary image formation face; and a photometry optical system arranged on an optical path of the divided luminous flux for photometry.

A seventh aspect of the present invention is a finder optical system according to the first aspect, further comprising a condenser lens provided in the vicinity of the objective lens side of the primary image formation face.

An eighth aspect of the present invention is a finder optical system according to the first aspect, further comprising an optical element which corrects an image face of the secondary image and is provided on the primary image formation face side in the vicinity of the secondary image formation face.

A ninth aspect of the present invention is a finder optical system according to the first aspect, wherein the focus plate is formed in curved shape to correct an image face of the secondary image.

A tenth aspect of the present invention is a finder optical system according to the first aspect, further comprising an optical element which corrects astigmatic difference and is provided in the vicinity of the primary image formation face side of the focus plate.

An eleventh aspect of the present invention is a finder optical system according to the first aspect, wherein the relay optical system is provided with a plurality of reflecting faces having power, and at least two of the plurality of reflective faces are free form surface.

A twelfth aspect of the present invention is a finder optical system according to the first aspect, further comprising an in-field display projection system which projects an in-field display image from the primary image formation face onto the focus plate.

A thirteenth aspect of the present invention is a finder optical system according to the first aspect, wherein the relay optical system comprises a zoom optical system.

A fourteenth aspect of the present invention is a finder optical system according to the fifth aspect, further comprising an in-field display projection system which projects an in-field display image onto the optical path divider in superimposition with a finder luminous flux.

A fifteenth aspect of the present invention is an imaging apparatus comprising: the finder optical system according to claim 1; an optical path switcher for dividing or reflecting a luminous flux passed through the objective lens, provided on the optical path in a subject side of the primary image formation face of the finder optical system; and an image pickup device which part of the luminous flux divided by the optical path switcher or the luminous flux passed through the objective lens enters.

A sixteenth aspect of the present invention is an imaging apparatus according to the fifteenth aspect, further comprising a lens barrel module which includes the objective lens and is attachably and detachably provided on the imaging apparatus.

A seventeenth aspect of the present invention is an imaging apparatus according to the fifteenth aspect, further comprising a lens barrel module which includes the objective lens and is provided integrally with the imaging apparatus.

DETAILED DESCRIPTION OF THE INVENTION

Figure 1:
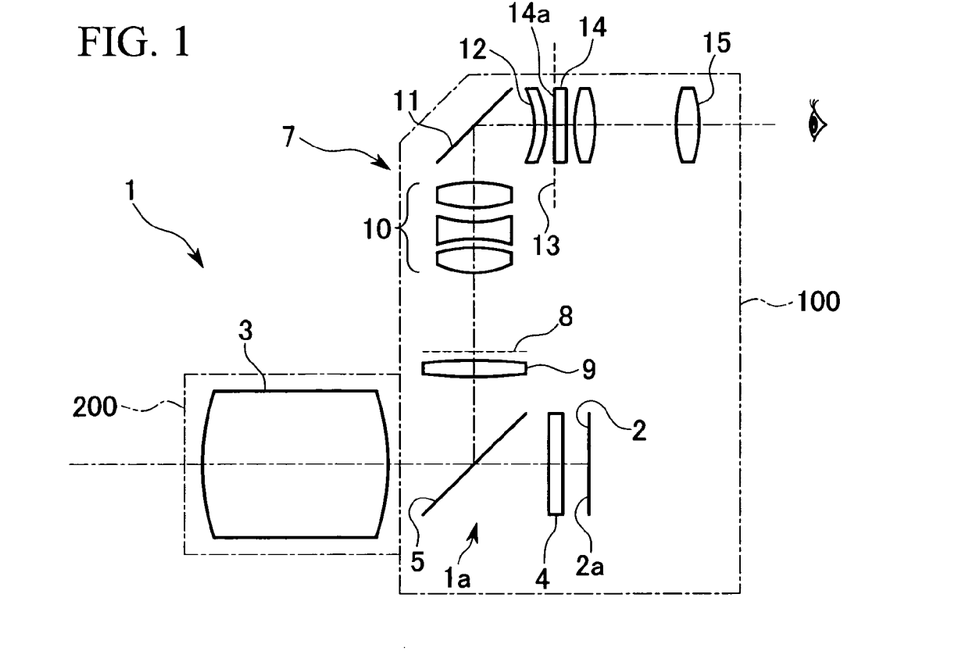
FIG. 1 is a figure of a camera including a finder optical system according to a first embodiment of the present invention.

Embodiments of the finder optical system of the present invention will be explained with reference to FIGS. 1 through 9. FIG. 1 is a schematic configuration figure of the finder optical system according to a first embodiment.

A digital camera according to the first embodiment shown in FIG. 1, e.g. a single-lens reflex camera 1 (imaging apparatus) comprises a camera body 100 (imaging apparatus) and a lens barrel module 200 provided attachably and detachably on the front position (subject side) of the camera body 100. The lens barrel module 200 includes an taking lens 3 (objective lens) for making a luminous flux, which enters the camera 1 from an object being photographed (subject), enter an image pickup face 2a of the camera body 100, an image pickup device 2 such as a film or a CCD (Charge-Coupled Device) having an image pickup face 2a, and a filter element 4 such as a low pass filter or an infrared-cutting filter which is installed near the subject side of the image pickup device 2.

The taking lens 3, the image pickup device 2, and the filter element 4 form an image-capturing optical system 1a.

An optical path divider 5 (optical path switcher) which divides/reflects the luminous flux for photographing is arranged between the image pickup face 2a inside the camera body 100 and the taking lens 3, and reflects some or all of the luminous flux for photographing to a finder optical system 7. The optical path divider 5 should be preferably composed of a half mirror, a prism having a half mirror face, or a so-called quick return mirror, etc.

In the finder optical system 7, a luminous flux forming an image of the object reflected by the optical path divider 5 (hereafter, 'finder light') forms an inverted image (primary image) on a primary image formation face 8. The position of the primary image formation face 8 is equivalent to that of the image pickup face 2a. A condenser lens 9 is provided near the optical path divider 5 side of the primary image formation face 8. Since any aberration caused by the condenser lens 9 can be corrected in combination with a relay lens system 10 and the like described later, it need not be arranged in very close proximity to the primary image formation face 8, even when provided on the taking lens 3 side of the primary image formation face 8.

A luminous flux passed through the primary image formation face 8 is transmitted through a relay lens system 10 (relay optical system) including a plurality of lenses, and reforms an image on a diffusing face 14a of a diffuser 14 which is provided on a secondary image formation face 13 via a reflecting mirror 11. The image of the object is reformed as an erecting image (secondary image) on the secondary image formation face 13. The erecting image is diffused by the diffusing face 14a and passes an ocular lens system 15 before reaching the eye of an observer.

A meniscus lens 12, for example, is arranged on the primary image formation face 8 side near the secondary image formation face 13 as a field flattener lens for correcting the field curvature of the primary image. A condenser lens may be applied instead of this field flattener lens.

Although in the finder optical system 7 shown in FIG. 1, a reflecting mirror 11 bends the optical path within the plane of the paper, the optical path may be bent perpendicular to the paper between the primary image formation face 8 and the relay lens system 10, and then further bent parallel to the paper between the relay lens system 10 and the ocular lens system 15. In this case, a prism may be used as the bending member besides the reflecting mirror. Alternatively, the incident face and the emission face of the prism may be formed as a lens face so as to be used as a condenser lens, a relay lens, and part of an ocular lens system.

Since the finder optical system 7 of this embodiment has the configuration described above, the luminous flux forming the image of the subject passes through the taking lens 3 and is divided by the optical path divider 5, bending part of the luminous flux from the subject is bent and forms an inverted image (primary image) on the primary image formation face 8 through the condenser lens 9. This primary image is reversed by the relay lens system 10 and reflected by the reflecting mirror 11 so as to reform an erecting image (secondary image) on the diffusing face 14a of the diffuser 14 which constitutes the secondary image formation face 13. The secondary image on the diffuser 14 is observed through the ocular lens system 15.

Since aberration caused by the condenser lens 9 which is provided near the primary image formation face 8 is corrected in combination with the relay lens system 10, the relay lens system 10 can be made smaller while achieving high performance. Moreover, the field curvature of the secondary image is corrected to maintain flatness by transmitting the luminous flux through the meniscus lens 12 when forming the secondary image.

According to the finder optical system 7 of the embodiment described above, since the diffuser 14 which functions as a focusing glass (focus plate) is provided on the secondary image formation face 13 where the image is reformed, eclipse of the luminous flux becomes hard to occur (optically defected due to a lens which causes the edge of the luminous flux being lost) compared to the case that the diffuser 14 is arranged on the primary image formation face 8. Also, a space for installing optical elements such as a focal point detection optical system, a photometry optical system, and so on, can be secured on the optical path between the primary image formation face 8 and the secondary image formation face 13, the focal point detection and the photometry with good precision without being affected by the diffuser 14 can be performed, and the various optical elements can be arranged with a large degree of freedom. Therefore, the diffuser 14 may have any kind of diffusion characteristics, since it does not adversely affect the characteristics of the optical elements installed between the primary image formation face 8 and the secondary image formation face 13, enabling the light to be used efficiently.

When the diffuser 14 is arranged on the primary image formation face 8 in the conventional manner mentioned earlier, the space for the other optical elements is restricted and the diffusion characteristics of the diffuser 14 change the amount of light and cause pupil information to be lost, consequently, when a focal point detection optical system, a photometry optical system, and the like, are installed at the rear end of the optical path, it becomes difficult to ensure the precision of the focal point detection and photometry; in addition, the diffusion characteristics of the diffuser 14 are restricted from reducing these adverse effects.

Next, the finder optical system according to another embodiment of this invention will be explained. Members and components which are identical or similar to those of the embodiment described above are represented by the same reference codes and repetitious explanation thereof is omitted.

Figure 2:
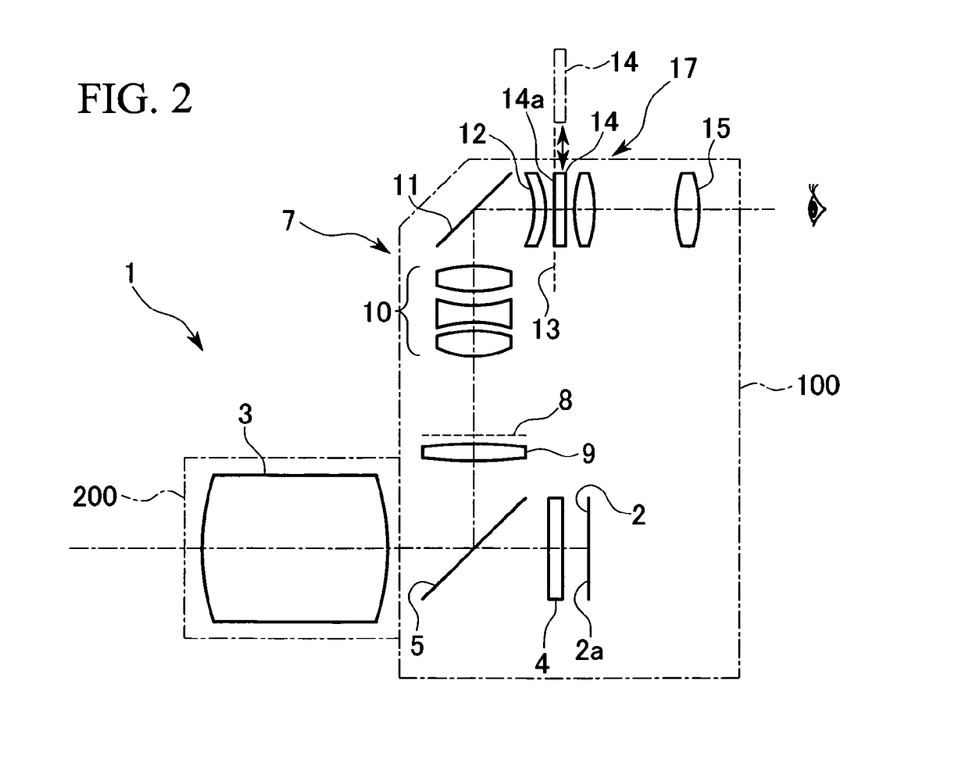
FIG. 2 is a figure of a camera including a finder optical system according to a second embodiment of the present invention.

FIG. 2 is a figure of a digital camera 1 which includes the finder optical system 7 according to a second embodiment, in which the arrangement of the optical parts is broadly identical to that of the first embodiment. In the second embodiment, the diffuser 14 arranged on the secondary image formation face 13 is equipped with a insertion/removal mechanism 17 enabling it to be inserted/removed to/from the optical path of the finder luminous flux.

When the diffuser 14 is provided on the primary image formation face 8, since this position is near the image-capturing optical system 1a it cannot easily be inserted/removed in view of the need to shut out light and the positional relationship with other nearby members, but in this embodiment, the diffuser 14 is provided on the secondary image formation face 13. Since this position is comparatively far from the image-capturing optical system 1a, the other members do not greatly restrict the space for inserting/removing the diffuser 14 and there is no effect on light shutout. Therefore, the diffuser 14 can be easily inserted/removed by using the insertion/removal mechanism 17.

In this embodiment, the diffuser 14 is attached on the optical path of the finder optical system 7 so that the secondary image is reformed on the diffusing face 14a and observed visually through the ocular lens system 15. This enables the observer to confirm blurring of the secondary image and adjust the focus by a manual operation or the like. Removing the diffuser 14 from the optical path enables a clear secondary image to be observed visually with good visibility.

According to the embodiment described above, the diffuser 14 can be inserted/removed easily and visibility of the secondary image can be improved by adjusting the focus by inserting/removing the diffuser 14.

Figure 3:
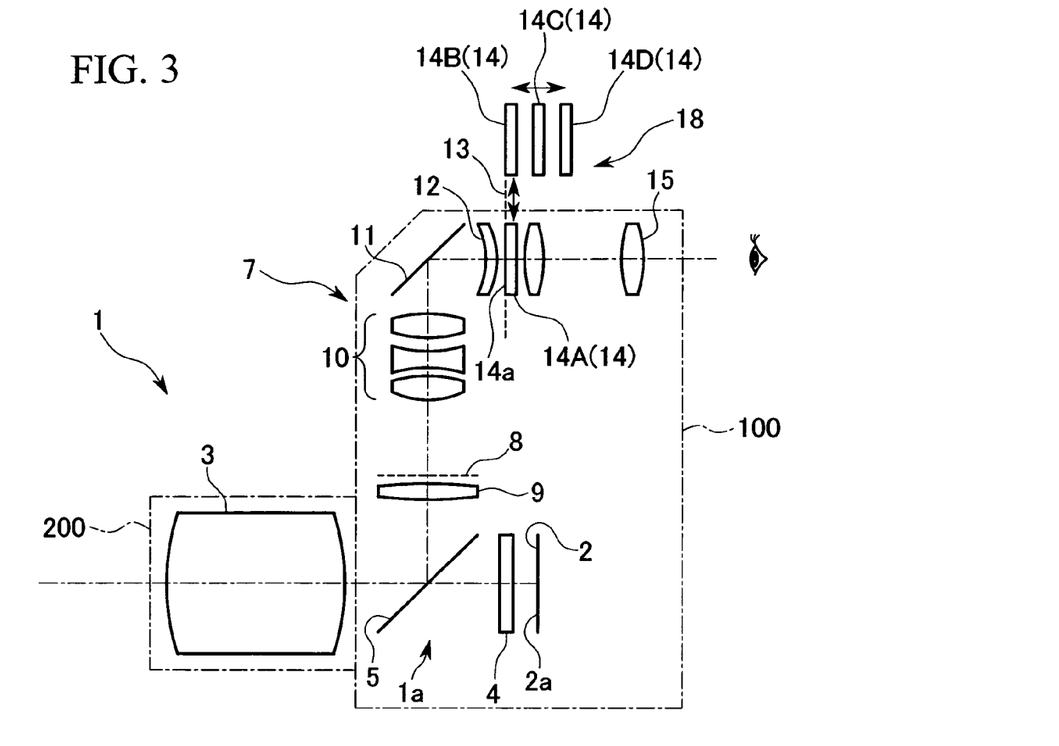
FIG. 3 is a figure of a camera including a finder optical system according to a third embodiment of the present invention.

FIG. 3 is a figure of a digital camera 1 which includes the finder optical system 7 according to a third embodiment, in which the arrangement of the optical parts is broadly identical to that of the first embodiment. In the third embodiment, an exchange/attachment mechanism 18 selects one of a plurality of diffusers 14A, 14B, 14C, and 14D having different diffusion characteristics, and attaches it as the diffuser 14 to the secondary image formation face 13.

On the primary image formation face 8, since the diffuser 14 is near the image-capturing optical system 1a, it cannot easily be inserted/removed in view of its positional relationship with other nearby members and the need to shut out light. In addition, the amount of light entering the focal point detection system and the photometry system fluctuates in accordance with disparity in the diffusion characteristics of the attached diffuser 14, making it difficult to perform stable focal point detection and photometry.

In contrast in this embodiment, the various types of diffusers 14A . . . 14D are attached by exchange at the secondary image formation face 13, whereby the other members do not greatly restrict the space for inserting/removing the diffusers 14A . . . 14D and there is no effect on light shutout, enabling it to be easily inserted/removed. Moreover, the diffuser 14A having large diffusion characteristics is attached when an observer adjusts the focus by a manual operation or the like, and the diffuser 14D having no diffusion characteristics or small diffusion characteristics is attached when adjusting by auto focus. This ensures that the secondary image has good visibility, the visual field can be easily confirmed, and there is a wide freedom of choice. The practical advantages are considerable, since there is a strong need to selectively use the diffusers 14A through 14D having different diffusion characteristics.

Incidentally, the plurality of diffusers 14A through 14D may either be stored inside the camera or extracted to the outside.

Figure 4:
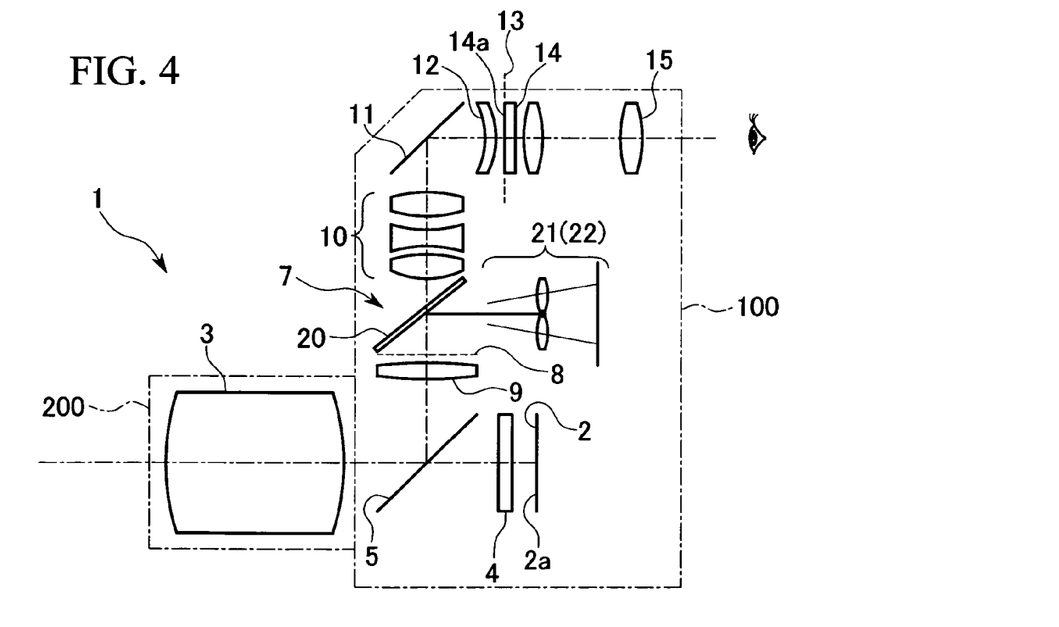
FIG. 4 is a figure of a camera including a finder optical system according to a fourth embodiment of the present invention.

FIG. 4 is a figure of a digital camera 1 which includes the finder optical system 7 according to a fourth embodiment, in which the arrangement of the optical parts is broadly identical to that of the first embodiment. In the fourth embodiment, a focal point detection optical system as another optical element is arranged between the primary image formation face 8 and the secondary image formation face 13.

In the finder optical system 7 shown in FIG. 4, an optical path divider for focal point detection such as a half mirror 20 is provided on the optical path between the primary image formation face 8 and the relay lens system 10, and a focal point detection system 21 is provided on the optical path of a luminous flux for focal point detection which is divided and reflected by the half mirror 20. In the embodiment shown in FIG. 4, a phase-difference focal point detection system 22 is used as the focal point detection system 21. In this case, since the diffuser 14 is not arranged on the primary image formation face 8, the light efficiently reaches the phase-difference focal point detection system 22 without its amount being reduced by diffusion and the phase information can be efficiently detected. A contrast focal point detection system may be used instead of the phase-difference focal point detection system 22.

In this finder optical system 7, the condenser lens 9 can be shared by the finder optical system 7 and the focal point detection system 21 for using. A reflecting mirror capable of being removed may be used instead of the half mirror 20 as the optical path divider for focal point detection. Another alternative is to use an optical element whose transmissivity and reflectivity can be electrically varied.

According to this embodiment, in comparison with a sub mirror type focal point detection system which is contingent upon a conventional quick return mirror, a wider viewing range can be easily obtained. In addition, since neither the finder optical system nor the focal point detection system require a condenser lens, the configuration for sharing them can be made simple.

Figure 5:
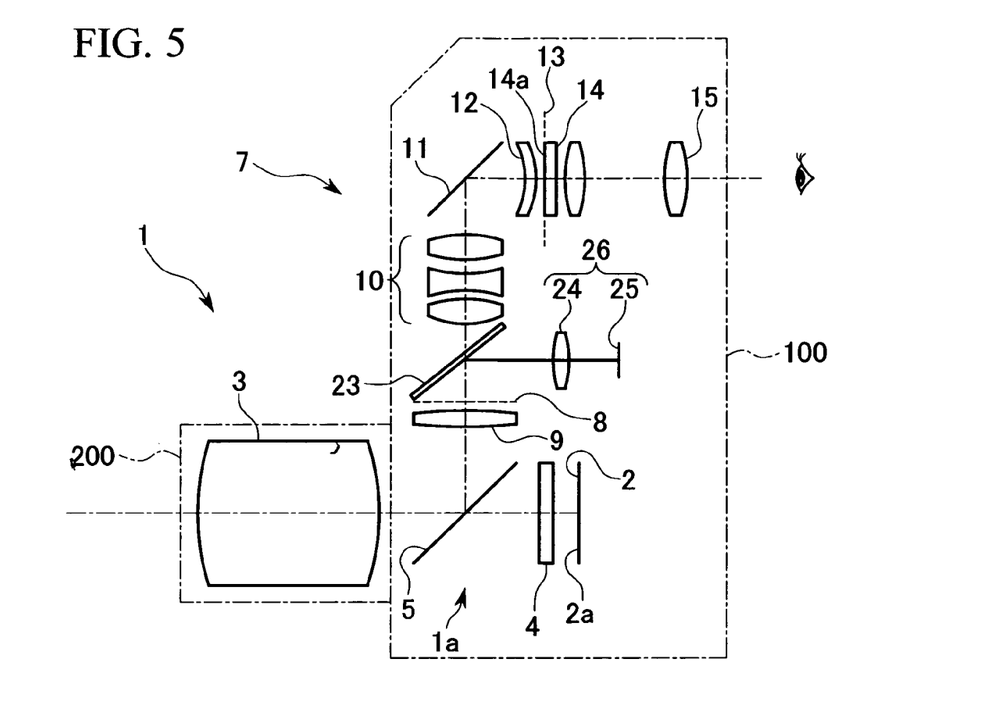
FIG. 5 is a figure of a camera including a finder optical system according to a fifth embodiment of the present invention.

FIG. 5 is a figure of a digital camera 1 which includes the finder optical system 7 according to a fifth embodiment, in which the arrangement of the optical parts is broadly identical to that of the first embodiment. In the fifth embodiment, a photometry optical system 26 as another optical system is arranged between the primary image formation face 8 and the secondary image formation face 13.

In the finder optical system 7 shown in FIG. 5, an optical path divider for focal point detection such as a half mirror 23 is provided on the optical path between the primary image formation face 8 and the relay lens system 10, and a photometry sensor 25 is provided with a condenser lens 24 on the optical path of a luminous flux for focal point detection which is divided and reflected by the half mirror 23. In this case, since the diffuser 14 is not arranged on the primary image formation face 8, the amount of light is not reduced by diffusion, and, since there is no angle which makes the image trapezoid, it is easy to measure the light accurately.

Figure 6:
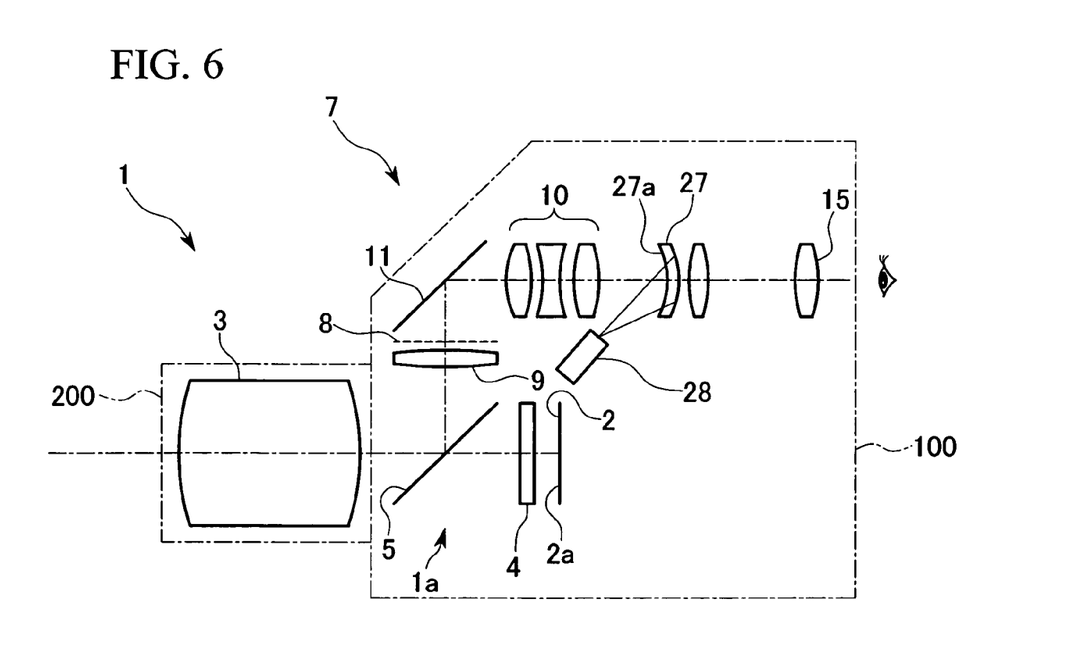
FIG. 6 is a figure of a camera including a finder optical system according to a sixth embodiment of the present invention.

FIG. 6 is a figure of a digital camera 1 which includes the finder optical system 7 according to a sixth embodiment.

In the finder optical system 7 shown in FIG. 6, the primary image formation face 8 is arranged via the condenser lens 9 along the path of the luminous flux which is divided and reflected by the optical path divider 5 of the imaging optical system 1*a*, and an image of an object is formed as an inverted image (primary image). Along the optical axis direction of the finder luminous flux, a reflecting mirror 11 which bends the luminous flux and a relay lens system (relay optical system) 10 are sequentially provided in front of the primary image formation face 8, and a curve-type diffuser 27 is provided on the secondary image formation face 13, an erecting image (secondary image) is reformed on a diffusion face 27*a* thereof. The erecting image is diffused by the diffusion face 27*a* and reaches the eye of the observer via the ocular lens system 15.

The curve-type diffuser 27 has a curved plate-like shape which forms a convexity on the ocular lens system 15 side and its curved face is shaped to match the image face curve, thereby ensuring flatness of the image face of the secondary image formation face and enabling aberration of the relay lens system 10 to be corrected. An in-field display projection system 28 for projecting an in-field display image onto the diffusion face 27*a* of the curve-type diffuser 27 is installed outside the optical path of the finder optical system 7. The in-field display projection system 28 projects an in-field display image onto the curve-type diffuser 27, therefore, it becomes possible to superimpose a clear in-field display image which has the same diopter as the subject image as the secondary image, and it becomes possible to observe this in-field display image through the ocular lens system 15. When the in-field display image is not being displayed, the object image can be displayed clearly without unnecessary display markings and the like in the field of vision.

The curve-type diffuser 27 needs not to be installed in combination with the in-field display projection system 28, however, it may be acceptable to project onto a flat face-type diffuser 14 using the in-field display projection system 28.

According to this embodiment, the curve-type diffuser 27 maintains the flatness of the image face, the precision of focal point detection from the center to periphery of the diffusion face 27*a* can be increased and in addition, the amount of finder light can be prevented from decreasing, therefore, the in-field display image can be displayed in superimposition without darkening the object image. This increases the freedom of the layout of the in-field display projection system, and enables its body to be made compact.

In contrast, in conventional finder optical systems the diffuser is provided on the primary image formation face 8, and a half mirror is inserted in front of the secondary image formation face so that the in-field display projection system 28 can project the in-field display image within the optical path, or a half mirror is inserted instead of the reflecting mirror for bending the optical path in front of the relay lens system and the in-field display image is projected onto this half mirror. This leads to problems of a decrease in the amount of finder light and less freedom of the layout for installing the in-field display projection system.

Figure 7:
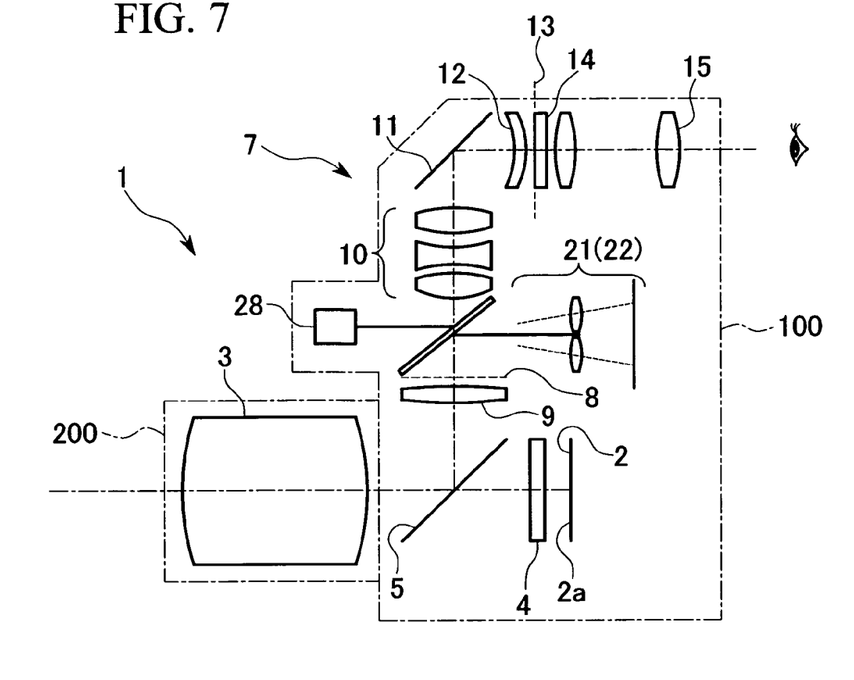
FIG. 7 is a figure of a camera including a finder optical system according to a seventh embodiment of the present invention.

FIG. 7 is a figure of a digital camera 1 which includes the finder optical system 7 according to a seventh embodiment. The arrangement of the optical elements is broadly the same as that of the first embodiment. In the seventh embodiment, the focal point detection system 21 and the in-field display projection system 28 are provided between the primary image formation face 8 and the secondary image formation face 13.

In the finder optical system 7 shown in FIG. 7, a half mirror 30, for example, is provided as an optical path divider and mixer on the optical path between the primary image formation face 8 and the relay lens system 10. The finder luminous flux which passes the primary image formation face 8 is divided by the half mirror 30, and, for example, the phase-difference focal point detection system 22 (or a contrast-type focal point detection system) is provided as the focal point detection system 21 on the optical path of the reflected luminous flux for focal point detection.

Outside the optical path of the finder luminous flux, the in-field display projection system 28 is provided so as to be facing the half mirror 30. The luminous flux of the in-field display image emitted from the in-field display projection system 28 is divided and reflected by the half mirror 30 and overlaps with the finder luminous flux which passes through the half mirror 30. Therefore, the secondary image of the object and the in-field display image can be displayed in superimposition on the diffuser 14 which is provided on the secondary image formation face 13.

In the finder optical system 7 according to this embodiment, the optical path between the focal point detection system 21 and the in-field display projection system 28 is divided and mixed by the same half mirror 30. This makes the layout more efficient and enables the luminous flux to be used efficiently. At the time of in-field display, since the part of the luminous flux from the in-field display projection system 28 is transmitted through the half mirror 30 and projected to the focal point detection system 21, it may be acceptable to have a certain gap between the timing of distance-measuring for detecting the focal point and the timing of the in-field display. Alternatively, when focal point detection and in-field display are executed simultaneously, the distance-measuring system should be constructed in the focal point detection system 21 with due consideration for the transmission luminous flux information of the in-field display projection system 28. This enables the focal point to be detected without influence from the luminous flux of the in-field display image.

Figure 8:
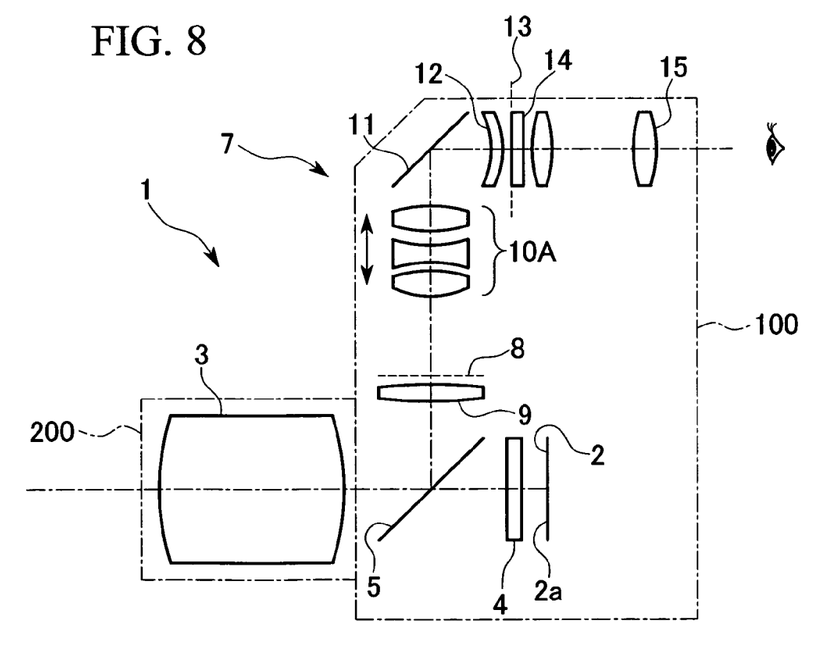
FIG. 8 is a figure of a camera including a finder optical system according to an eighth embodiment of the present invention.

FIG. 8 is a figure of a digital camera 1 which includes the finder optical system 7 according to an eighth embodiment. The arrangement of the optical elements is broadly the same as that of the first embodiment. In the eighth embodiment, the relay lens system 10A between the primary image formation face 8 and the secondary image formation face 13 is set to a zoom optical system or a magnification switching system. In this case, the image magnification from the primary image formation face 8 to the secondary image formation face 13 can be varied by moving some or all of the lens groups which constitute a zoom-type relay lens system 10A forwards and backwards in the optical axis direction of the finder luminous flux. Moreover, since the positional relationship between the diffuser 14 and the eye of the observer does not change, a stable image is obtained.

Figure 9:
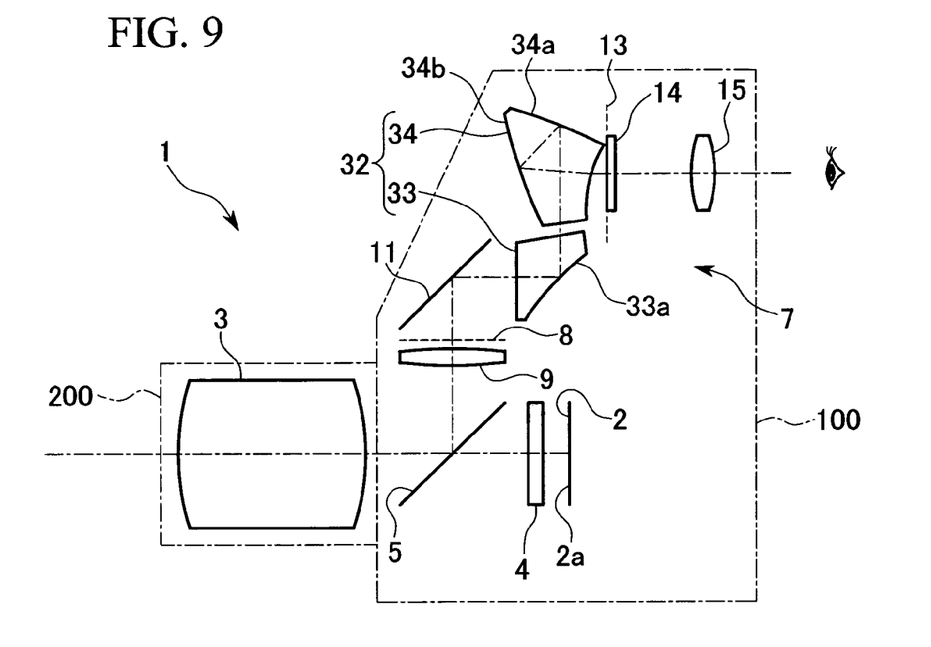
FIG. 9 is a figure of a camera including a finder optical system according to a ninth embodiment of the present invention.

FIG. 9 is a figure of a digital camera 1 which includes the finder optical system 7 according to a ninth embodiment. The arrangement of the optical elements is broadly the same as that of the first embodiment. In the ninth embodiment, a relay lens system 32 comprising a prism having more than one or two free form surface (the axis of symmetry having no more than one face) is provided between the primary image formation face 8 and the secondary image formation face 13 instead of the relay lens system 10 comprising a plurality of lens groups. A free form surface is a face in which has neither in-plain nor out-plain rotational axis.

In the embodiment of FIG. 9, a first free form surface prism 33 and a second free form surface prism 34 are provided as the relay lens system 32. At least two or more faces of the first and second free form surface prisms 33 and 34 which reflect/transmit the luminous flux should be free form surface.

In the example of FIG. 9, the luminous flux reflected by the reflecting mirror 11 is reflected by a free form surface 33a of the first free form surface prism 33 and is incident upon the second free form surface prism 34, and, after being reflected by a reflecting face 34a, the luminous flux is reflected by a second free form surface 34b and emitted from the second free form surface prism 34. Thereby, an erecting image (secondary image) is formed on the diffusing face 14a of the diffuser 14.

Although in FIG. 9, the optical path is bent within the plane of the paper, it may be bent perpendicular to the paper, for example, between the primary image formation face 8 and the relay lens system 32, and then further bent parallel to the paper by a combination of the first and second free form surface prisms 33 and 34.

According to this embodiment, the free form surface prisms make it possible to construct a high-performing relay lens system 32 which is inexpensive and saves space.

Figure 10:
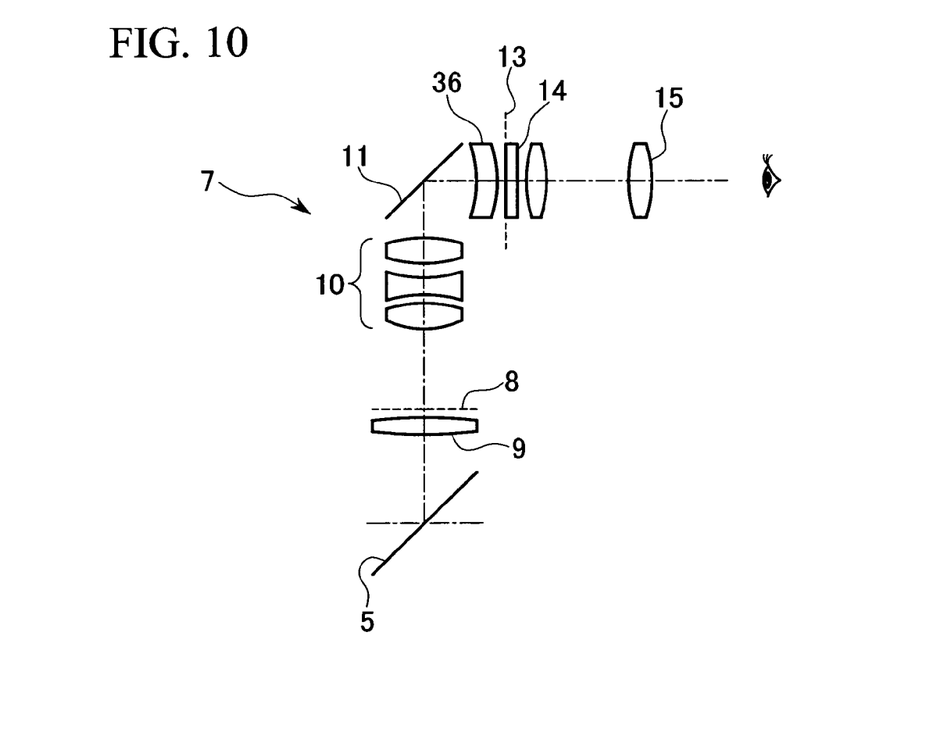
FIG. 10 is a figure of the configuration of principle parts of a modification example of a finder optical system.

FIG. 10 shows the configuration of principle parts of a modification of the finder optical system 7 according to the abovementioned embodiments.

In the finder optical system 7 shown in FIG. 10, instead of the meniscus lens 12 (field flattener) for correcting field curvature which is provided in each of the above embodiments, a lens 36 (optical element) for correcting astigmatic difference is provided near the primary image formation face 8 side of the diffuser 14. This lens 36 is, for example, thicker than the meniscus lens 12 and is curved to a larger radius of curvature.

With this configuration, the precision of focal point detection from the center to periphery of the diffuser 14 can be increased without increasing the number of lenses as in the configuration including the field flattener.

Furthermore, in the above configuration, if the flat plate-like diffuser 14 is replaced with the curve-type diffuser 27 shown in FIG. 6, the field curvature and astigmatic difference can be corrected without increasing the number of lenses, further increasing the precision of the focal point detection.

Alternatively, the meniscus lens 12 and the lens 36 for correcting astigmatic difference may be arranged on the primary image formation face 8 side of the flat plate-like diffuser 14, obtaining similar effects.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. For example, while in the figures illustrating each of the embodiments described above, the optical path bends within the plane of the paper in order to simplify understanding of the optical system, this should not be considered limitative, it being preferable to realize the most efficient layout within the body of the camera.

While in the embodiments the lens barrel module 200 comprising the taking lens 3 can be attached to/removed from the camera body 100, this should not be considered limitative, it being acceptable to provide the camera body 100 integrally with the lens barrel module 200.

According to this invention, the focus plate is provided not on the primary image formation face which has an equivalent position to an imaging surface but on the secondary image formation face, enabling the secondary image formed on the focus plate to be observed. Thereby, eclipse of the luminous flux becomes hard to occur compared to the case of observing the primary image on the primary image formation face, and the focus plate becomes easy to be inserted/removed. By arranging a condenser lens having positive power near the primary image formation face, the peripheral luminous flux can be refracted in the optical axis direction and the diameter of the relay lens group can be reduced. Since the axial luminous flux and the luminous flux which forms the periphery of frame pass through the same region of the relay lens group, superior image performance can be obtained on the secondary image formation face by providing a plurality of lenses. When placing the focus plate on the primary image formation face, it is not essential to provide a condenser lens for reducing the diameter of the relay lens group since there is a solution to diffuse the peripheral luminous flux in the optical axis direction by using a diffusion characteristics, nor is it essential to provide a plurality of lenses since the secondary image formation face is not required to achieve a high level of image formation performance. The luminous flux can be more efficiently transmitted and the diameter of the relay lens group can be reduced by arranging a condenser function member near the secondary image formation face. It is also possible to obtain a space for installing the taking lens or, more preferably, other optical elements such as a focal point detection optical system, a photometry optical system and the like. Since these other optical elements are unaffected by the focus plate, they can obtain highly precise detection and measurement, making the luminous usability of the finder optical system more efficient.

When the focus plate is provided on the secondary image formation face, it can be inserted/removed easily in relation to other components; for example, there is less effect on light shut-out when inserting/removing the focus plate than when it is provided on the primary image formation face, and it can easily be inserted/removed without removing, for example, the taking lens. It is thus possible to provide a clear image, for example, by manually adjusting the focal point and, confirming focusing, blurring and so on, with the focus plate installed in the optical path, and by increasing the brightness of the image with the focus plate removed.

The focus plate may be a diffuser which can be replaced with another focus plate having different diffusion characteristics. Thereby, it becomes possible to adjust/set the appearance of the secondary image by attaching focus plates having different diffusion characteristics in accordance with the requirements of a camera user (e.g. when using auto focus or when adjusting the focus manually etc.).

The focal point can be detected by leading a luminous flux which does not pass through the focus plate to the focal point detection optical system. Therefore, the focal point can be detected stably irrespective of the attachment/removal of the focus plate, over a wide field and with negligible change over time.

The light can be measured by leading a luminous flux which does not pass through the focus plate to the photometry optical system. Therefore, the light can be measured precisely and stably irrespective of the attachment/removal of the focus plate, and it becomes easier to respond to the F-value.

By providing an in-field display projection system to project an in-field display image onto the optical path divider, a single optical path divider can selectively or simultaneously divide and mix the optical path.

Since this condenser lens can correct aberration in combination with the relay optical system without being affected by the position of the primary image formation face, the relay optical system can be made smaller and high-performing. Arranging the focal point detection optical system and the photometry optical system between the primary image formation face and the secondary image formation face enables them to use the condenser function jointly. This facilitates miniaturization since condenser lenses for the focal point detection optical system and photometry can be omitted from the configuration.

By providing an optical element for correcting the field curvature, such as a field flattener, the flatness of the image face of the secondary image formation face with respect to the primary image formation face can be achieved, and the precision of focal point detection from the center to the periphery of the focus plate can be increased.

By giving the focus plate a curved shape in connection with the field curvature, the precision of focal point detection from the center to the periphery of the focus plate can be increased.

By correcting astigmatic difference caused by astigmatism, the precision of focal point detection from the center to the periphery of the focus plate can be increased.

By applying an optical element such as a free form surface prism having two or more free form surface as the relay optical system, the relay optical system can be made smaller and high-performing.

By providing an in-field display projection system which projects an in-field display image from the primary image formation face side onto the focus plate, it makes easy to adjust the diopter to a subject image and to superimpose an in-field display image clearly upon overlapping it on the subject image. Moreover, when the in-field display image is not being displayed, it becomes easy to make the in-field display position more difficult to be recognized in the finder. Thereby, it becomes easier to concentrate on a subject. Also, there is no need to provide a half mirror or the like for in-field display, it becomes possible to simplify the finder optical system and prevent any reduction in the amount of light.

According to this invention, it is possible to obtain an imaging apparatus comprising the finder optical system having the various characteristics mentioned above, such as making eclipse of the luminous flux hard to occur and increasing the freedom of arranging the various optical systems.

According to the finder optical system of this invention, the focus plate is arranged on the secondary image formation face instead of the primary image formation face, thereby eclipse of the luminous flux becomes hard to occur, compared to the case of arranging it on the primary image formation face. Moreover, since a space for installing optical elements such as a focal point detection optical system, a photometry optical system, and so on, can be set between the taking lens and the secondary image formation face, enabling focal point detection and light measurement to be performed with good precision without being affected by the focus plate, more efficient usability of light in the finder optical system can be achieved. Also, the focus plate can be inserted/removed and replaced without unpleasantly affecting the light shut-out characteristics.

What is claimed is:

1. A finder optical system, in which a primary image is formed by an objective lens on a primary image formation face and is passed via a relay optical system to form a secondary image on a secondary image formation face, the secondary image being observed via an ocular lens system, the finder optical system comprising:
   a condenser lens having positive power arranged in the vicinity of the primary image formation face; and
   a focus plate arranged at a position of the secondary image formation face, the total number of focus plates in the finder optical system being only one, wherein
   the relay optical system comprises a relay lens group having positive power and including a plurality of lenses, and is arranged between the condenser lens and the secondary image formation face.

2. A finder optical system according to claim 1, wherein the focus plate is attachably and detachably provided on the optical path.

3. A finder optical system according to claim 1, wherein the focus plate includes a diffuser and is provided exchangeably with another focus plate having different diffusion characteristics.

4. A finder optical system according to claim 1, further comprising:
   an optical path divider for dividing a luminous flux into a finder luminous flux and a luminous flux for focal point detection, arranged between the primary image formation face and the secondary image formation face; and
   a focal point detection optical system arranged on an optical path of the divided luminous flux for focal point detection.

5. A finder optical system according to claim 1, further comprising:
   an optical path divider for dividing a luminous flux into a finder luminous flux and a luminous flux for photometry, arranged between the primary image formation face and the secondary image formation face; and
   a photometry optical system arranged on an optical path of the divided luminous flux for photometry.

6. A finder optical system according to claim 1, further comprising a condenser lens provided in the vicinity of the objective lens side of the primary image formation face.

7. A finder optical system according to claim 1, further comprising an optical element which corrects an image face of the secondary image and is provided on the primary image formation face side in the vicinity of the secondary image formation face.

8. A finder optical system according to claim 1, wherein the focus plate is formed in curved shape to correct an image face of the secondary image.

9. A finder optical system according to claim 1, further comprising an optical element which corrects astigmatic difference and is provided in the vicinity of the primary image formation face side of the focus plate.

10. A finder optical system according to claim 1, wherein the relay optical system is provided with a plurality of reflecting faces having power, and at least two of the plurality of reflective faces are free form surface.

11. A finder optical system according to claim 1, further comprising an in-field display projection system which projects an in-field display image from the primary image formation face onto the focus plate.

12. A finder optical system according to claim 1, wherein the relay optical system comprises a zoom optical system.

13. A finder optical system according to claim 4, further comprising an in-field display projection system which projects an in-field display image onto the optical path divider in superimposition with a finder luminous flux.

14. An imaging apparatus comprising:
the finder optical system according to claim 1;
an optical path switcher for dividing or reflecting a luminous flux passed through the objective lens, provided on the optical path in a subject side of the primary image formation face of the finder optical system; and
an image pickup device which part of the luminous flux divided by the optical path switcher or the luminous flux passed through the objective lens enters.

15. An imaging apparatus according to claim 14, further comprising a lens barrel module which includes the objective lens and is attachably and detachably provided on the imaging apparatus.

16. An imaging apparatus according to claim 14, further comprising a lens barrel module which includes the objective lens and is provided integrally with the imaging apparatus.

\* \* \* \* \*